May 22, 1928.
C. C. WORTHINGTON
1,670,645
LAWN MOWER CUTTER DRIVE
Filed Aug. 8, 1922
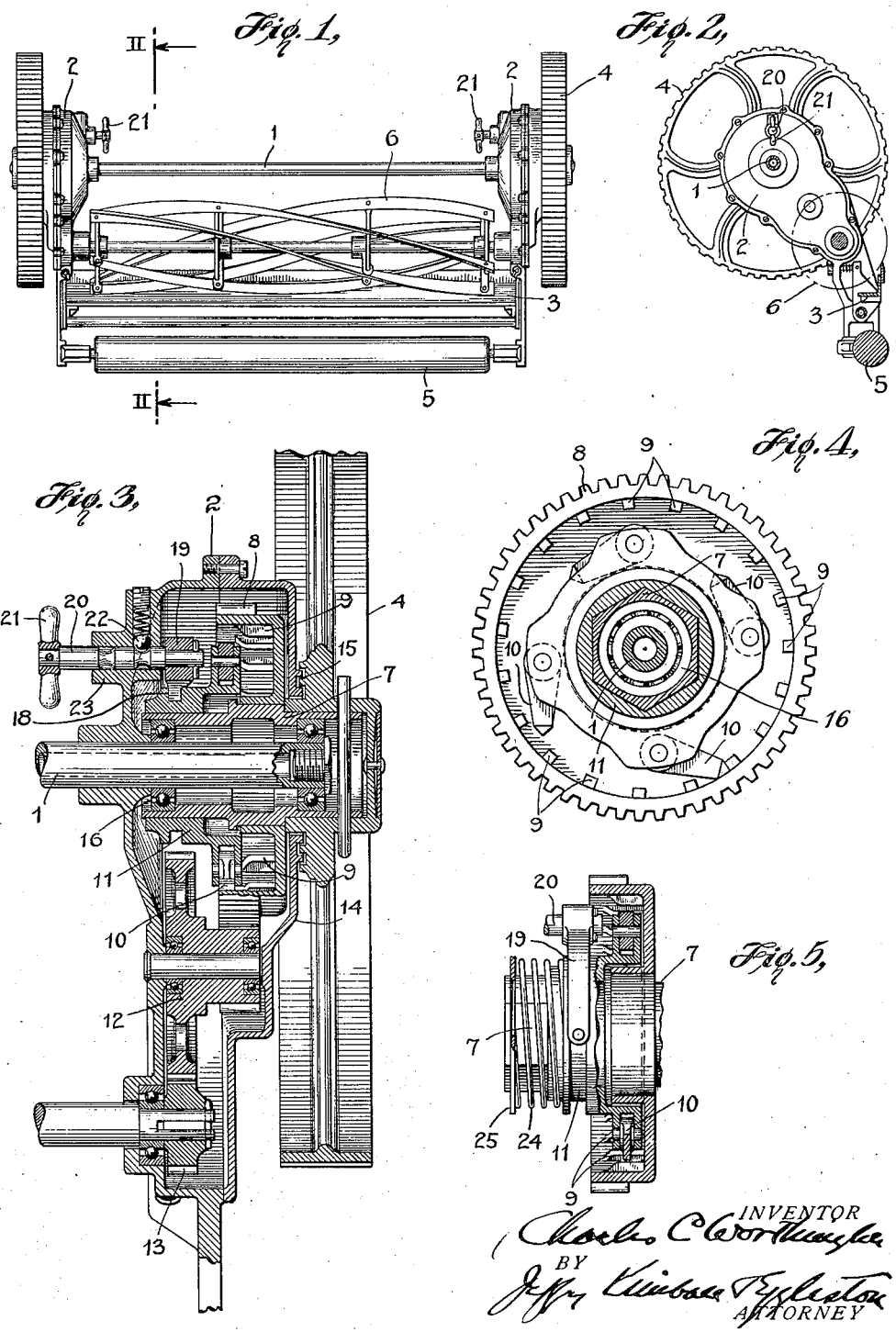

Patented May 22, 1928.

1,670,645

UNITED STATES PATENT OFFICE.

CHARLES C. WORTHINGTON, OF DUNFIELD, NEW JERSEY.

LAWN-MOWER CUTTER DRIVE.

Application filed August 8, 1922. Serial No. 580,397.

The invention is an improved ratchet clutch drive and cutter-releasing mechanism for lawn mowers, and more particularly for mower units having rotary cutters as used in gang lawn mower machines. Its object is to produce a mechanism jointly serving the function of a ratchet drive for the cutter or fly knife of such machines and a cutter-releasing means therefor which interrupts the cutter drive when the machine is to be moved about without cutting the grass, and to produce such mechanism in compact form and rugged design, which is the least subject to deterioration from wear and most easily operated to release the fly knife when desired and which also possesses various other practical advantages hereinafter made apparent to those skilled in this art.

In the accompanying drawings:—

Fig. 1, is a top plan of a lawn mower with the invention applied.

Fig. 2, a vertical section on the line II—II, Fig. 1;

Fig. 3, an enlarged section of the cutter-driving gear train:

Fig. 4, a section through the main hub; and

Fig. 5, a slightly modified form.

The lawn mower shown comprises a frame consisting of a cross member or axle rod 1 rigidly uniting the two side members or gear cases 2 and a bed knife structure 3 which joins the rear ends of said gear case members. This frame is carried on a rolling support at each end represented in the present case by the ground or driving wheels 4 at the front and a roller 5 at the rear. Its rotary cutter or fly knife 6 is appropriately journaled in the gear cases to cooperate with the bed knife 3 in the usual way and is driven by the driving wheels. For this purpose a motion-multiplying, cutter-driving gear-train is housed in one or both of the side cases 2, according to customary design in this type of lawn mower, it being immaterial to this invention whether the fly knife is driven by one or both of the ground wheels. The axle rod 1 is secured to the casing 2 which contains such gear train by a pressed fit in the bored boss thereof as indicated in Fig. 3 and its end within said casing carries two ball bearings for supporting the main wheel hub 7. The hub of the ground wheel 4 is removably pinned or otherwise secured to the outer end of this main hub and the main gear 8 of the driving train is mounted on said hub to rotate therein in a position or plane closely adjacent to the ground wheel. The gear 8 is internally formed with or carries, a ring of inwardly facing ratchet teeth 9 adapted to be engaged by one or more of the gravity seated pawls 10 pivotally carried on a collar 11, which latter is mounted on the hub 7 so that it is movable axially but not rotatably thereon. In preference to the use of an ordinary spline for this purpose, the hub is made polygonal or octagonal in section as shown in Fig. 4, and the clutch collar slidingly fits such section, which mounting is found to possess special advantages. The collar 11 is movable on the hub from the position shown in Fig. 3 to that indicated in the modified form of Fig. 5. In the position of the latter figure, the pawls occupy the plane of the ring of ratchet teeth and one or more of them engages with said teeth so that the forward rotation of the hub 7 will drive the gear 9 and through it the compound pinion 12 and fly-knife pinion 13, but the gear 8 may rotate forwardly with respect to the hub when necessary, as when the ground wheel stops or slows down or when there are two gear trains and one of the drive wheels rotates faster than the other. On such occasions the pawls 10 merely ride over the ratchet teeth as will be understood, thus providing the familiar over-running ratchet drive effect for the fly-knife. When the collar 11 is moved to its other position, indicated in Fig. 3, the pawls 10 are thereby shifted sideways out of engagement with the ratchet teeth and then seat upon and are adapted to ride along the smooth track or interior rim surface of the gear 8 immediately adjacent the teeth 9, in which condition they of course impart no motion to the gear. The fly knife is thus released or disconnected from the ground wheels. Return of the pawls into the plane of the ratchet teeth is facilitated by bevelling either the ends of the teeth or the sides of the pawls, or both. In the case in hand the teeth are bevelled and the ends of the pawls are straight and about as wide as the width of the teeth, which gives them a full bearing on the latter besides increasing the weight of their free ends which ensures prompt engagement. The gear 8 and pawl-carrying collar 11 thus constitute a clutch couple, the members of which are opened and closed by axial movement of one with respect to the other, and it will be plain that so far as the clutching effect is concerned, it is merely a matter of design which of the members is arranged to be moved or whether the movable member carries the pawls or the ratchet teeth or vice-versa, because the effect is obviously the same in either case. It is however preferred to mount the pawls on pivots or pivotal axes which are parellel to the axis of the hub and gear, and to support such pivotal axes on a sliding clutch collar so that the pawls occupy the space within the rim of the gear in both positions because this arrangement of parts is particularly compact and rugged and provides the most satisfactory disposition of the driving strains. It is preferred, though not essential, that the clutch collar 11 be the only axially movable member of the couple and that it shall be located on the opposite side of the main gear 8 from the drive wheel 4 and that it shall be entirely enclosed within the gear-case against access of dirt, all as shown in the drawing.

The gear-case is closed by a cover 14 applied on the outer side of the mower frame, i. e. adjacent the ground wheel, and is thereby adapted to contain a body of lubricant so that the gear train may run in oil. Escape of such oil is prevented by the labyrinthic packing 15 between the cover and the driving wheel. The inner end of the main hub 7 is open at 16 to receive lubricant for the ball bearings and the outer end of the hub is closed by the wheel hub. On the removal of the drive wheel, the cover may be taken off and the several interior parts are then exposed and may be removed without disassembling the parts constituting the frame of the mower.

When it is desired to release the fly knife so that it will not be driven by the drive wheel, the over-running clutch members are opened and held opened by the operation of an exterior handle member which is mounted in the body part of the gear-case, forward of the cross rod 1 and on the inside of the frame of the mower. For this purpose, the clutch collar 11 is provided with an annular groove 18 engaged by a shipper fork 19 mounted on the end of a short push rod 20 provided with a handle 21 and with two annular sockets for co-operation with a spring-pressed ball detent 22. The push rod extends through a long boss 23 on the casing wall, the length thereof within the boss sufficing to prevent leakage of lubricant at this point, and by moving it inwardly or outwardly, the clutch couple is closed and opened as will be apparent. It will be obvious that a lever could be mounted on the gear-case and connected to the shipper fork or clutch collar with the same effect.

In the modified form of Fig. 5, the construction is substantially identical with that already described except that the clutch collar 11 is normally urged by a spring 24 toward its coupled or closed position. The spring is interposed between a shoulder on the collar and a split ring abutment 25, snapped or otherwise secured in a groove in the end of the main hub 7. The addition of the spring ensures complete movement of the parts in the direction to close the clutch and tends to prevent imperfect or incomplete engagement of the pawls with the ratchet teeth such as might occur if the push rod 20 in Fig. 3 were not pushed fully inward. The use of such a spring is preferred but it will be obvious that the spring could, if desired be located elsewhere to give the same effect.

I claim:—

1. In a lawn mower, ground wheels, a fly-knife driving gear including the ground wheel hub and two concentric axially separable clutch members, one fast and the other loose on said hub, one of them having a rim provided with an interior row of ratchet teeth and the other carrying a pawl adapted to swing on an axis parallel to said axis and adapted to be removed from the plane of said row of teeth by relative movement in the direction of said axes to interrupt the fly-knife drive.

2. In a lawn mower, a gear case, a fly-knife driving gear train located therein comprising a main gear and driving connections to the fly-knife, an over-running ratchet and clutch couple mounted one on the main gear and the other on the hub of the ground wheel and comprising one member formed with a circular row of ratchet teeth and an adjacent circular smooth surface or track, and the other member carrying pawl mechanism radially swinging in the plane of said row of teeth or in that of said track, and means for relatively and axially moving said members to cause said mechanism to engage either said teeth or track to complete or interrupt the fly-knife drive.

3. In a lawn mower, a ground wheel, a fly-knife driving gear train comprising gearing driven by said ground wheel and constituting operative driving connections therefrom to the fly-knife shaft to rotate the same, said gearing including an over-running ratchet and clutch couple comprising a gear constituting part of the fly-knife driving gear train and also one of the clutch members and having an external series of gear teeth and an internal circular series of ratchet teeth overlapping the gear teeth and a smooth cylindrical surface or track adjacent the ratchet teeth, the other member of the clutch couple carrying gravity pawl mechanism within said internal series of ratchet teeth and track adapted to move toward or from the axis of the row of ratchet teeth in planes intersecting the axis and into driving contact with the teeth or into sliding contact with the track, and means for relatively shifting said clutch members to bring said teeth and pawl mechanism or said track and pawl mechanism opposite each other as desired to effect such action and thereby complete or interrupt the fly-knife drive.

4. In a lawn mower, a fly-knife driving gear train including the ground wheel hub and an over-running ratchet and clutch couple, one of whose members is mounted on the ground wheel hub and which comprises one clutch member having ratchet teeth bevelled lengthwise at their ends, and the other clutch member having radially swinging pawl mechanism adapted to coact with said teeth and means for disengaging and engaging said mechanism with the teeth by relative movement in a direction parallel with the teeth to interrupt or complete the fly-knife drive.

5. In a lawn mower, ground wheels, one of the ground wheels having a driving hub, a main driving gear free on the driving hub, a fly-knife shaft, a gear on the fly-knife shaft, an intermediate gear set connecting the main gear with the fly-knife shaft gear, and a clutch collar non-rotatably slidable on the driving hub, said gear having a row of ratchet teeth parallel with the hub axis and said collar having one or more pawls for said teeth adapted to be engaged and disengaged therefrom by the axial movement of the collar and pawls with reference to said teeth to complete or interrupt the fly-knife drive.

6. In a lawn mower, an oil-tight side gear casing, a fly-knife driving gear train located therein and comprising a driving hub extending into the casing, a main gear rotatably mounted on the driving hub and a clutch collar non-rotatably slidable thereon, said gear having ratchet teeth and said collar having a pawl pivoted thereon to swing in planes intersecting the axis of the hub at right angles, and means outside the casing for moving the collar on the hub to engage or disengage the pawl with said ratchet teeth to complete or interrupt the fly-knife drive.

7. In a lawn mower, ground wheels, a gear casing, a fly-knife driving train therein, driven from one of the ground wheels and including a cup-shaped gear constituting also a clutch member and having a rim formed with external gear teeth and a row of ratchet teeth carried by the gear in the space within the cup formed by the rim, both said series of teeth being intersected by a common plane at right angles to the axis of said gear, a clutch member having pawl mechanism adapted to be moved axially within said cup-shaped gear to complete or interrupt the fly-knife drive and means accessible on the exterior of the casing for so moving said mechanism, and intermediate gearing completing the train to the fly-knife shaft.

8. In a lawn mower, ground wheels, a gear casing, a fly-knife driving train located therein and comprising gearing driven by one of the ground wheels and constituting operative driving connections therefrom to the fly-knife to rotate the same, said gearing including a cup-shaped gear constituting a clutch member having a rim formed with external gear teeth on the outer side and ratchet teeth on its inner side and a clutch member carrying pawl mechanism to engage the ratchet teeth, one of said members being loose, and the other member being fast on the ground wheel hub, and means outside the casing for axially moving one of said members with respect to the other for disaligning and aligning said pawl mechanism with said teeth to interrupt or complete the fly-knife drive.

9. In a lawn mower, an oil-tight gear case, a fly-knife driving gear train located therein and including the ground wheel hub, the main gear mounted on said hub, a gear on the fly-knife shaft and an intermediate gear having toothed portions in mesh respectively with said main gear and said fly-knife shaft gear, and pawl and ratchet means, one fast and the other loose with respect to the ground wheel hub, mounted one on the main gear and the other on the ground wheel hub and adapted to be engaged and disengaged by relative axial movement.

10. In a lawn mower, an oil-tight gear case, a fly-knife driving gear train located therein and including the ground wheel hub, the main gear mounted on said hub, a gear on the fly-knife shaft and an intermediate gear having toothed portions in mesh respectively with said main gear and said fly-knife shaft gear, and a clutch couple comprising a set of ratchet teeth mounted on the main gear, and an axially movable pawl collar on the ground wheel hub, adapted to be engaged and disengaged by relative axial movement.

11. In a lawn mower, a gear case, a fly-knife driving gear train located therein and including the ground wheel hub, the main gear mounted thereon, and driving connections between the main gear and fly-knife shaft, including pawl and ratchet mechanism comprising radially swinging pawls and a series of ratchet teeth, one of the members of said pawl and ratchet mechanism being fast to the hub and the other loose thereon, and said mechanism being adapted to be engaged and disengaged by relative axial movement.

12. In a lawn mower a ground wheel hub, a main driving gear loose on said hub, and an intermediate gear set connecting said main gear with the fly-knife shaft gear, an axially shiftable pawl collar fast to said hub carrying radially swinging pawls, and ratchet teeth carried by the main gear and constituting with the pawl collar an axially engageable and disengageable clutch couple.

12. In a lawn mower, a ground wheel hub, a main driving gear loose on said hub and having a rim provided with a set of exterior gear teeth and having a set of ratchet teeth carried by the gear within the rim, an intermediate gear set connecting said main gear with the fly-knife shaft gear, and a pawl collar fast to said hub carrying radially swinging pawls and adapted to be moved axially into and out of engagement with the teeth within the rim.

14. In a lawn mower, a ground wheel, a fly-knife driving gear train having its first gear coaxial with and driven by said ground wheel, and having gearing meshing therewith and operatively connecting the ground wheel to the fly-knife for rotating the same, a clutch couple associated with the gear train and having its driving member co-axial with and fast to the ground wheel and its loose or driven member axially supported with its axis coaxial with that of the ground wheel, said clutch comprising two axially separable clutch members, one having ratchet teeth and the other carrying pawl mechanism movable radially in planes intersecting the axis of rotation at right angles thereto and adapted to be removed from said teeth to interrupt the cutter drive by relative axial movement of said members.

15. In a lawn mower, a ground wheel, a gear casing, a fly-knife driving gear train within the casing and including the ground wheel hub, a main gear rotatable with reference to the ground wheel, coaxial therewith and driven thereby, another gear meshing with the main gear and geared to the fly-knife to rotate the same, an over-running ratchet and clutch couple one of whose members is fast to said hub and the other or loose member of which is coaxial with the ground wheel and carried by the main gear and which clutch couple comprises two members one of which has a row of ratchet teeth which are parallel with its axis of rotation and the other of which has pawl mechanism pivoted thereon to swing radially in planes intersecting the axis of rotation at right angles into and out of driving engagement with said teeth, and means for wholly disengaging said mechanism and teeth by relative movement of said members in the direction of said axis and teeth.

16. In a lawn mower, ground wheels, a fly-knife shaft, a ground wheel driven fly-knife gear train including intermeshing gears requisite to complete the train to the fly-knife shaft, an over-running ratchet and clutch couple, one of whose members is fast to said ground wheel and the other of which is coaxial with the ground wheel and connected to the fly-knife shaft by gearing constituting part of said gear train, which clutch couple comprises two axially separable clutch members, one of them having ratchet teeth and a cylindrical track in adjacent planes and the other carrying pawl mechanism having pivoted pawls for independent radial movement into and out of tooth contact to complete or interrupt the fly-knife drive and adapted to be removed from said teeth by movement of one of said members axially of the ground wheel to bring the pawls into the plane of the track, and a spring urging said member in the opposite direction to maintain the fly-knife drive normally complete.

17. In a lawn mower, ground wheels, a fly-knife, a gear casing, a fly-knife driving gear train comprising a main gear constituting the first gear of the train coaxial with and driven by one of the ground wheels, and intermediate gearing, said gear train constituting operative driving connections from the ground wheel to the fly-knife to rotate the same, and said driving connections including a ratchet and clutch couple located within said casing and comprising one clutch member having ratchet teeth and the other clutch member having pawl mechanism adapted to coact with said teeth, a spring within the casing normally holding said pawl mechanism in engagement with said ratchet teeth, and means extending exterior to the casing and operable from without the casing for disengaging the pawl mechanism from said teeth by compressing said spring.

18. In a lawn mower, a ground wheel cutter drive including a gear train and an over-running clutch associated therewith, ground wheels and a fly-knife, said gear train being operatively connected to one of said ground wheels for driving thereby and including a main gear coaxial with the ground wheel and constituting the first gear of the train, a gear on the fly-knife shaft and an intermediate gear having tooth portions in mesh respectively with said main gear and said fly-knife gear to rotate the fly-knife, said overrunning clutch comprising members one of which rotates with the ground wheel and the other of which is carried by the main gear, and a casing housing said gear train and clutch members, one of said clutch members having a series of ratchet teeth and the other a set of pawls pivoted to swing in a plane intersecting the axis of the ground wheel, said drive being adapted to be completed or interrupted by relative axial shift of co-operating members of one of said two agencies first above named out of or into cooperative relation with each other, one of said members being said main drive gear.

In testimony whereof, I have signed this specification.

CHARLES C. WORTHINGTON.